US006973052B2

(12) United States Patent
Wang et al.

(10) Patent No.: US 6,973,052 B2
(45) Date of Patent: Dec. 6, 2005

(54) HYBRID POWER SAVE DELIVERY METHOD IN A WIRELESS LOCAL AREA NETWORK FOR REAL TIME COMMUNICATION

(75) Inventors: Huai Y. Wang, Greenacres, FL (US); Ye Chen, Schaumburg, IL (US); Stephen P. Emeott, Rolling Meadows, IL (US); Floyd D. Simpson, Lake Worth, FL (US); Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/741,659

(22) Filed: Dec. 19, 2003

(65) Prior Publication Data

US 2005/0135302 A1 Jun. 23, 2005

(51) Int. Cl.[7] .............................................. H04B 7/005
(52) U.S. Cl. ...................... 370/278; 370/338; 370/449; 710/46
(58) Field of Search ........................ 370/311, 278, 282, 370/338, 330, 349, 395.4, 400, 401, 352–356, 370/328, 329, 449; 455/452, 6.3, 445, 517; 703/2; 340/503; 375/130; 710/46; 709/203

(56) References Cited

U.S. PATENT DOCUMENTS

| | | | | |
|---|---|---|---|---|
| 5,940,771 | A * | 8/1999 | Gollnick et al. | 455/517 |
| 6,023,621 | A * | 2/2000 | Jackson et al. | 455/452.2 |
| 6,404,751 | B1 * | 6/2002 | Roark et al. | 370/330 |
| 2003/0152059 | A1 * | 8/2003 | Odman | 370/338 |
| 2004/0042435 | A1 * | 3/2004 | Soomro et al. | 370/338 |
| 2004/0131019 | A1 * | 7/2004 | Kandala | 370/311 |
| 2005/0135318 | A1 * | 6/2005 | Walton et al. | 370/338 |

* cited by examiner

*Primary Examiner*—John Pezzlo
(74) *Attorney, Agent, or Firm*—Scott M. Garrett

(57) ABSTRACT

A mobile station establishes a schedule by which data is exchanged with an access point. The schedule allows the mobile station to use a low power mode at times outside of the scheduled service periods. However, the mobile station may occasionally need to retrieve additional data from the access point, or transmit additional data to the access point, and so initiates an unscheduled service period to do so.

13 Claims, 4 Drawing Sheets

HYBRID POWER SAVE DELIVERY METHOD IN A WIRELESS LOCAL AREA NETWORK FOR REAL TIME COMMUNICATION

TECHNICAL FIELD

This invention relates in general to wireless local area networks, and more particularly to power save methods for reducing power consumption at a mobile station while engaged in a time sensitive communication activity.

BACKGROUND OF THE INVENTION

Wireless LAN (WLAN) systems providing broadband wireless access have experienced a spectacular rise in popularity in recent years. While the principal application of these systems has been in providing network connectivity to portable and mobile devices running data applications such as, for example, email and web browsing, there has been a tremendous and growing interest in supporting isochronous services such as telephony service and streaming video.

One of the key issues facing wireless system designers when considering voice and other time-sensitive services over a WLAN connection, such as one described by the IEEE 802.11 specification, is the power consumption of handheld devices. For example, in order to deliver competitive talk time and standby time, as compared to digital cordless or cellular devices, power conservation during voice calls become necessary. Several organizations have proposed power-efficient operation via transmit power control and physical layer rate adaptation for systems that rely on a centrally controlled contention-free channel access scheme. However, such approaches can be complex to implement and may not provide the power savings required to justify the complexity.

The 802.11 standard defines procedures which can be used to implement power management in a handheld device during periods of inactivity. In particular, three distinct building blocks are provided to support power savings: a Wakeup Procedure, a Sleep Procedure, and a Power-save Poll (PS-Poll) Procedure. A mobile client voice station (mobile station) can combine these building blocks in various manners to support power management for different applications.

Wakeup Procedure: There are generally two reasons for the mobile station to wake up, namely to transmit pending data or to retrieve buffered data from the fixed station serving the mobile station, known as an access point. Waking up to transmit data is a straightforward operation, driven by the mobile station. The decision to wake up and receive data is also made by the mobile station after monitoring its pending data bit in a periodic beacon frame transmitted by its access point. Once the mobile station decides to transition from sleep mode to active mode, it notifies the access point by sending an uplink frame with the power-save (PS) bit set to active. Following such transmission, the mobile station remains active so the access point can send any buffered downlink frames afterward.

Sleep Procedure: Similar to the wakeup procedure, a mobile station in the active mode needs to complete a successful mobile station-initiated frame exchange sequence with PS bit set to sleep to transition into the sleep mode. Following this frame exchange sequence, the access point buffers all the downlink frames to this mobile station.

PS-Poll Procedure: Instead of waiting for the access point to transmit the buffered downlink frames, a power-save mobile station can solicit an immediate delivery from its access point by using a PS-Poll frame. Upon receiving this PS-Poll, the access point can immediately send one buffered downlink frame (immediate data response) or simply send an acknowledgement message and response with a data frame later (delayed data response). For the immediate data response case, a mobile station can stay in sleep state after finishing this frame exchange since there is no need for the mobile station to transition to active state given that the access point can only send a buffered downlink frame after receiving a PS-poll from the mobile station. On the other hand, for the delayed data response case, the mobile station has to transition to the active state until receiving a downlink frame from the access point.

The architecture of a simple enterprise WLAN system is depicted in FIG. 1. Referring now to FIG. 1, there is shown a block system diagram overview 100 of a typical enterprise WLAN system. It includes an infrastructure access network 101, consisting of an Access Point 102 and mobile stations such as a data stations 104 and a voice station 106. The mobile stations are connected to the access point via a WLAN radio link 108. The access point is wired to a distribution network, including voice and data gateways 110, 112 respectively, through a switch 114. The voice station runs a Voice-over-IP (VoIP) application, which establishes a peer-to-peer connection with the voice gateway, representing the other end of the voice call, and which routes voice data to a voice network 116. Data stations may connect to the data gateway via the access network and connect to, for example, a wide area network 118. The impact of data traffic on voice quality should be considered. It is assumed that both the voice and data stations employ a prioritized contention-based quality of service mechanism.

VoIP traffic characteristics make voice over WLAN applications uniquely suited for power save operation. In particular, VoIP applications periodically generate voice frames, where the inter-arrival time between frames depends upon the voice coder chosen for an application. The process of encapsulating voice frames into IP packets is commonly referred to as packetization, which is often assumed to occur once every 20 millisecond. A typical VoIP conversation involves a bi-directional constant bit rate flow of VoIP frames, including an uplink flow from the handset to a voice gateway and a downlink flow in the reverse direction.

Since the station generally knows in advance the frame arrival rate, delay, and bandwidth requirements of its voice application, it can reserve resources and set up power management for its voice flows in agreement with the access point. A mobile station may forgo power save mode, and remain in active mode, always ready for the downlink voice transmission. In this case, the access point may transmit downlink voice frames as they arrive. However, if power save is desired, the mobile station may employ the power save building blocks described previously to wake up, exchange the VoIP frame with its access point, and go back to sleep.

In a shared-medium network, such as the access network shown in FIG. 1, it is important to prioritize VoIP traffic over traffic requiring only best-effort delivery, such as the traffic generated by application that can adapt to the amount of bandwidth available in the network and do not request or require a minimum throughput or delay. Prioritization allows the system to minimize the delay experienced by delay-sensitive traffic. A contention-based channel access scheme offering prioritized access named Enhanced Distributed Channel Access (EDCA) has been specified in the IEEE 802.11e draft, and is suitable for VoIP applications. It is based upon the Carrier Sensing Multiple Access with Collision Avoidance (CSMA/CA) mechanism defined in 802.11. Stations with voice frames to send must first sense the channel for activity, before transmitting. If the channel has been idle for at least a specified period of time, called an arbitration inter-frame space (AIFS), the mobile station can immediately begin its transmission. Otherwise, the mobile station backs off and waits for the channel to be idle for a random amount of time, which is equal to an AIFS period plus a uniformly distributed value between zero and a contention window (CW) time period value. The CW is further bounded by Minimum contention window (CWmin) and Maximum contention window (CWmax). EDCA provides prioritized access control by adjusting contention parameters: AIFS, CWmin, and CWmax. By selecting different values of AIFS, CWmin, and CWmax for different access categories, the priority to access the medium can be regulated and differentiated. In general, small AIFS, CWmin, and CWmax values result in higher access priority.

It is possible for a mobile station to use information such as the inter-arrival time of downlink voice frames, along with a power-save mechanism, to put itself to sleep between two consecutive voice frames. Presently there are power save procedures described in various papers and WLAN related specifications.

The first prior art power management mechanism utilizes a bit in the packet header. The bit is designated as a power management (PM) bit to signal the change of the power state of the mobile station to the access point. First, a mobile station transitions from sleep mode to active mode upon having an uplink data frame to transmit by setting the PM bit to active in an uplink voice frame to notify the change of its power state. Knowing that there will be one corresponding downlink frame buffered at the access point, because uplink and downlink vocoder share the same voice frame duration, the mobile station stays in active mode for the downlink transmission. After receiving the uplink transmission, the access point then sends buffered downlink frames to the mobile station. In the last downlink frame, the access point sets the "more data" bit to FALSE to communicate the end of the downlink transmission. Finally, the mobile station needs to complete a successful station-initiated frame exchange sequence with PM bit set to sleep to transition into the sleep mode. (e.g. an uplink frame, or a Null frame if there is no uplink data frame to transmit, with the PM bit set to sleep). In the following context, the PM-bit based mechanism is referred to as LGCY6 in the art.

A second power management mechanism uses a PM-Poll frame to solicit downlink frames. Instead of waiting indefinitely for the access point to deliver downlink transmission, the PM-Poll based mechanism utilizes the PM-Poll frame to retrieve the buffered downlink frame from the access point. First, a mobile station transitions to active mode upon having an uplink data frame to transmit. The mobile station then sends out the uplink transmission. Similar to the PM-bit based mechanism, the access point sets the more data field to indicate the presence of any buffered downlink transmission. If the more data bit is TRUE, the mobile station will continue to send a PM-Poll frame to retrieve the buffered downlink frame. Unlike the PM-bit based mechanism, a mobile station can stay in the sleep state since the access point responds to the PM-Poll with an immediate data frame. In the following context, the PM-Poll based mechanism is referred to as LGCY5 in the art.

There are a couple of issues in supporting power-efficient VoIP operation using the current WLAN power save mechanisms. First, the PM-bit based mechanism is somewhat inefficient because, for example, the 802.11 standard currently only offers one way for the mobile station to transition to sleep mode, which is by initiating a frame exchange sequence with PM bit set to sleep. As a result, an extra mobile station initiated frame exchange is needed per bidirectional voice transfer in order for the mobile station to signal power state transition. Since the payload of a voice frame is small (e.g. 20 bytes for voice application with 20 ms framing and 8 Kbps vocoder), the overhead incurred by the extra frame exchange could be as high as one third of the traffic between the mobile station and access point. The significant overhead results in the inefficiency on both power consumption and system capacity PM-Poll based mechanism, since a mobile station is not aware of the priority of the buffered downlink frame, the PM-Poll frame is sent as a the best effort access attempt, which is a data traffic mode instead of a voice traffic mode. As a result, the downlink voice transmissions essentially use the best-effort priority instead of the higher voice priority. When a system is loaded with both data traffic using best-effort priority with voice traffic, and a mobile station retrieves downlink voice traffic using a power save poll frame transmitted at the same priority as data traffic, the system will be unable to protect the voice traffic from the delays associated with a congested best-effort delivery system. Legacy power save methods may also require an uplink or poll frame to retrieve each buffered frame for the down link, or require immediate response from the access point for a given uplink frame. One method of providing a particular quality of service is to use scheduled service periods at regular intervals for a given mobile station. This scheduled mode of power save deliver is referred to as automatic power save delivery (APSD). The mobile station wakes up at regular intervals and listens to the channel. The access point is synchronized to the service period, and transmits data at the scheduled time. Thus, the mobile station can put the WLAN subsystem to sleep during the periods between scheduled service intervals. However, this method limits the flexibility of the WLAN channel since there is no ability for the mobile station to deviate from the schedule. Therefore, given these shortcomings of the prior art, there is a need for a reliable power management protocol in a WLAN system that permits mobile station with active voice sessions to efficiently enter and exit power save mode without excessive overhead and maintain quality of service in the presence of lower priority traffic.

DETAILED DESCRIPTION OF A PREFERRED EMBODIMENT

Figure 1:
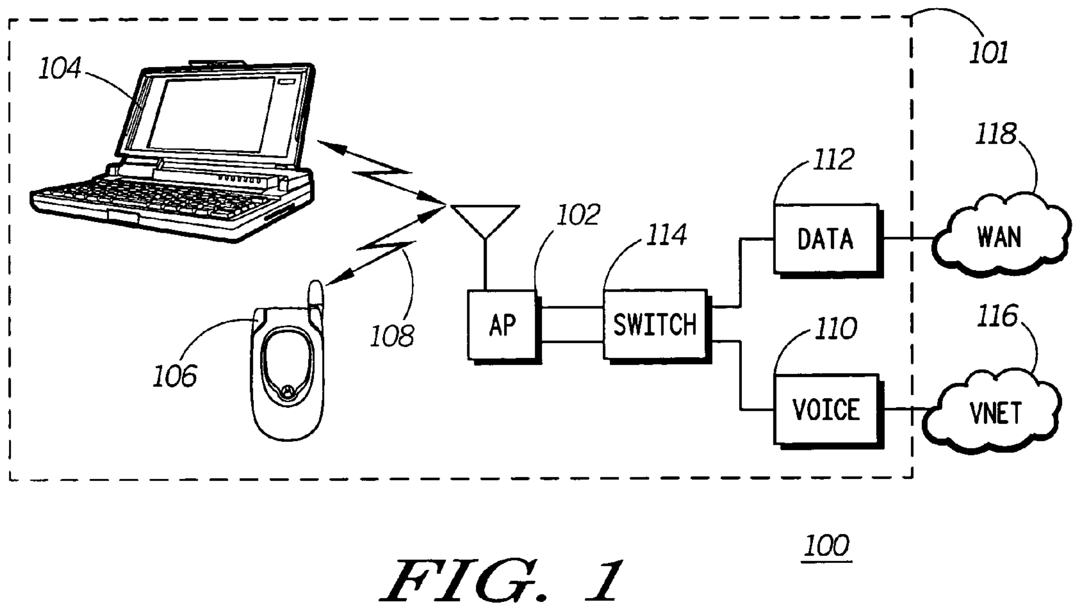
FIG. 1 shows a block system diagram overview of a typical enterprise WLAN system that may support both prior art methods of WLAN transactions as well as those in accordance with the present invention.

While the specification concludes with claims defining the features of the invention that are regarded as novel, it is believed that the invention will be better understood from a consideration of the following description in conjunction with the drawing figures, in which like reference numerals are carried forward.

The invention solves the problems associated with the prior art method of scheduled operation by allowing a more flexible use of scheduled and unscheduled transactions. The mobile station first establishes a scheduled stream to be used in association with a high priority access category flow, such as a real time voice call or a video stream, for example. Accordingly, the mobile station enters a low power mode, and waits for a scheduled service period to begin. The scheduled service periods occur at regular intervals and have a predetermined duration. Occasionally the access point may have to terminate the service period before all buffered data can be delivered. At the end of the scheduled service period, the mobile station may receive notice from the access point that the access point still has data buffered for the mobile station, and may indicate the type or access category of data that is buffered at the access point. At the end of the scheduled service period, the mobile station may place its WLAN componentry in a low power mode. The mobile station may then initiate an unscheduled service period before the next scheduled service period to retrieve the remaining data, if conditions allow. For example, before deciding to initiate an unscheduled service period, the mobile station may check its battery status to see if there is sufficient power budget, or it may determine, based on information provided by the access point, that the data remaining at the access point is of an access category that requires immediate attention. The mobile station may also use the unscheduled transaction to service low priority data flows.

Figure 2:
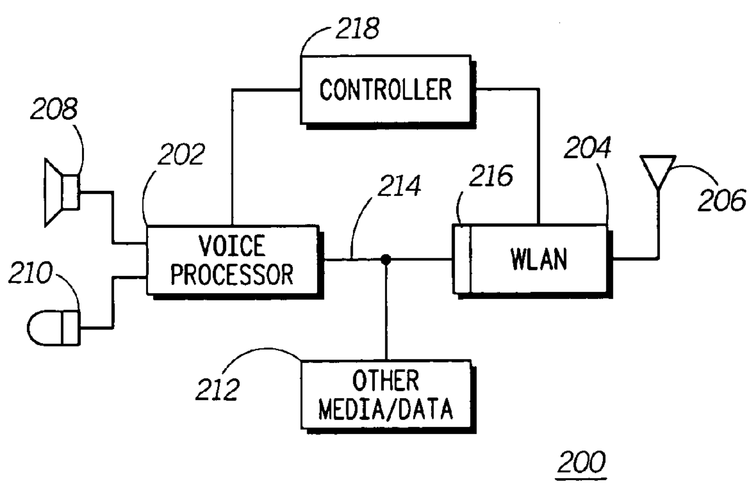
FIG. 2 shows a schematic block diagram of a mobile station for use in a WLAN system, in accordance with the invention.

Referring now to FIG. 2, there is shown a schematic block diagram 200 of a mobile station for use in a WLAN system, in accordance with the invention. The mobile station comprises a voice processor 202 for processing voice signals, including transforming signals between digital and analog form. The voice processor is operably coupled to a WLAN subsystem 204. The WLAN subsystem contains data buffers and radio hardware to send and receive information over a wireless radio frequency link via an antenna 206. The voice processor converts digital voice and audio data received from the WLAN subsystem to analog form and plays it over a transducer, such as a speaker 208. The voice processor also receives analog voice and audio signals from a microphone 210, and converts them to digital signals, which are sent to the WLAN subsystem. Preferably the voice processor also performs voice encoding and decoding, by using, for example, vector sum excited linear predictive coding techniques, as is known in the art. The use of voice encoding allows for compression of the voice data. In addition to voice processing, the mobile station may have other media processors, abstracted as box 212, which may included regular data applications such as email, for example. These other data processors are likewise operably coupled to the WLAN subsystem via bus 214, for example. As data arrives at the WLAN subsystem, it gets buffered in a WLAN buffer 216 and subsequently packetized for transport over IP networks. Each processor sending data to the WLAN subsystem indicates the type of data, and formats the data for transmission, indicating the type of data in the frame. All data processors and the WLAN subsystem are controlled by a controller 218. The controller dictates the power save operation of the WLAN subsystem, setting it into lower power states when appropriate and powering it up when it is time to transmit or receive data.

Figure 3:
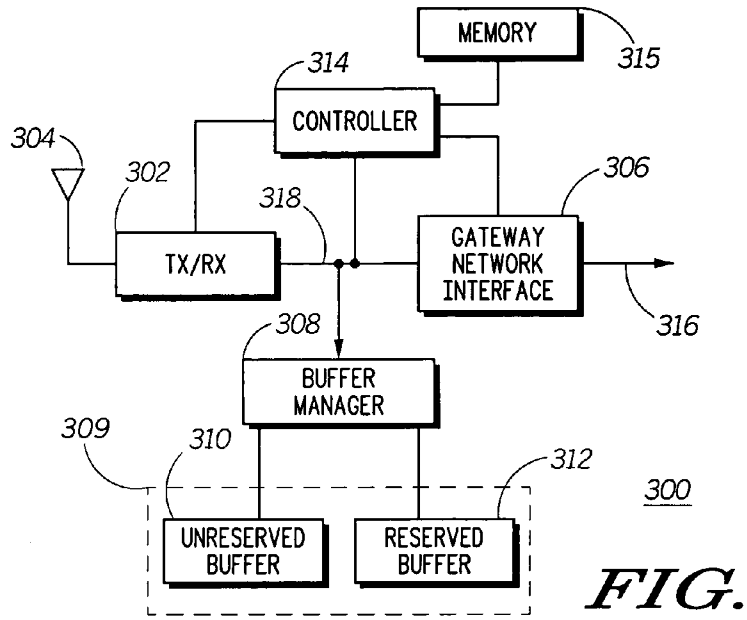
FIG. 3 shows a schematic block diagram of an access point for use in a WLAN system, in accordance with the invention.

Referring now to FIG. 3, there is shown a schematic block diagram 300 of an access point for use in a WLAN system, in accordance with the invention. A WLAN transceiver 302 performs the radio frequency operations necessary for communicating with mobile stations in the vicinity of the access point via an antenna 304. The access point is connected to networks via gateway network interface 306, typically via a hard line 316, such as a coaxial cable, for example. Data received at the access point from mobile stations is immediately forwarded to the gateway for routing to the appropriate network entity. Data received at the access point from the network that is bound for a mobile station may be treated according to one of at least three classifications. First, the mobile station may be in active mode, in which case the data will be buffered only until it can be transmitted. In such a case the intent is to not delay transmission to the mobile station any longer than necessary, and data for a mobile station of this classification is transmitted typically transmitted using a priority-based queuing discipline. A second category of mobile station power save state is a mobile station in an unreserved or legacy power save mode. For this second classification, a buffer manager 308 buffers the data in an unreserved data buffer 310 upon receiving it from the gateway 306 via a bus 318. Unreserved data is data that does not belong to a reserved traffic stream. When the particular mobile station for which the unreserved data is buffered transmits to the access point either an unreserved data power save poll frame or a frame that transitions the mobile station to the active state, the access point will respond by transmitting the unreserved data to the polling station from the unreserved data buffer. The manner of delivery may be controlled by the mobile station, where the unreserved data is only delivered in response to a specific polling or trigger frame, or it may be delivered at regularly scheduled and agreed upon time intervals. A third power save classification the access point may receive data for is reserved data bound for a mobile station using the present hybrid power save method. Reserved data is data that belongs to a reserved traffic stream. For a reserved flow data, the buffer manager 308 buffers the data in a reserved buffer, such as reserved buffer 312. By reserved buffer it is meant that the buffer is for buffering data belonging to a reserved traffic stream, such as a real time voice call. Most of the reserved data is intended to be transmitted during scheduled service periods which occur at regular intervals.

Although illustrated here as two separate physical buffers, one skilled in the art will understand that a variety of buffering techniques may be used to keep reserved and unreserved data separate, without necessarily requiring separate physical buffers. Furthermore, given that the access point will respond to the polling frame with an aggregate response, the unreserved data buffer and reserved buffer may be treated as an aggregate buffer 309. In one embodiment of the invention when the access point is polled by the mobile station during an unscheduled service period the access point empties the aggregate buffer by transmitting all aggregate buffered data to the mobile station. In other power save methods, the access point will typically enforce an aging policy so as to prevent too much reserved data from being buffered at the access point. However, using the present hybrid method, the access point may rely on the mobile station initiating unscheduled transaction to retrieve remaining reserved data rather than discarding reserved data as in other methods.

Supervising the operation of the buffer manager 308, gateway 306, and transceiver 302 is a controller 314. The controller also administers resource management and controls resources so that quality of service may be assured as needed for reserved traffic streams. The controller is operably coupled to a memory 315, which it uses to track the status of call, mobile station power save states, and other parameters.

Figure 4:
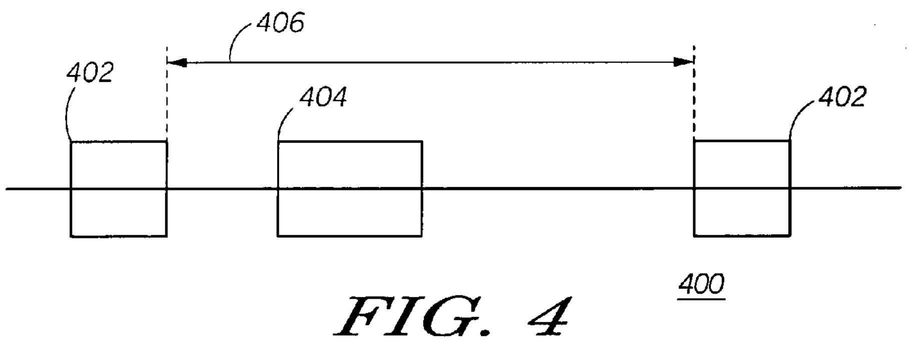
FIG. 4 show a flow diagram illustrating an overview of the traffic flow between a mobile station and an access point in a WLAN system for supporting voice quality communication and using both scheduled and unscheduled transactions, in accordance with the invention.

Referring now to FIG. 4, there is shown a flow diagram 400 illustrating an overview of the traffic flow between a mobile station and an access point in a WLAN system for supporting voice quality communication and using both scheduled and unscheduled transactions in accordance with the invention. The mobile station and access point engage in scheduled transactions at regular intervals 402. Prior to the beginning of a scheduled service period the mobile station exits low power mode by powering up the WLAN subsystem. The schedule is predetermined and agreed upon by the access point and mobile station. The access point will typically begin transmitting data to the mobile station, if there is data to transmit, under the assumption that the mobile station is awake and receiving the data. It is contemplated that the access point may be finishing a transaction with another mobile station at the beginning of the scheduled service period, so the mobile station simply waits for its data to appear in WLAN channel. At the end of the scheduled service period, the access point transmits a frame indicating whether the access point still has data buffered at the access point for the mobile station that could not be delivered within the duration of the scheduled service period. Such indication is easily given in a control field of the packet header of the frame. The control field may include a bitmap describing the access categories and whether data for each of the access categories is present. Thus, the control field allows the mobile station to determine the priority of the data remaining at the access point. In response to the presence of data remaining at the access point, the mobile station may initiate an unscheduled service period 404 if conditions allow. The unscheduled transaction can then be used to retrieve the remaining data, as well as transmit data to the access point for routing. The access point may limit the number of unscheduled service periods a mobile station can initiate between scheduled service periods.

Figure 5:
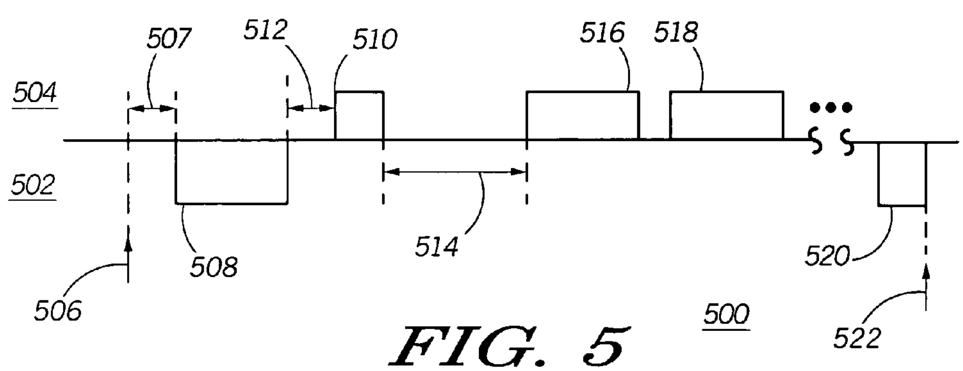
FIG. 5 show a flow diagram illustrating an overview of the traffic flow between a mobile station and an access point in a WLAN system for supporting voice quality communication during an unscheduled transaction, in accordance with the invention.

Referring now to FIG. 5, there is shown a flow diagram 500 illustrating an overview of the traffic flow between a mobile station and an access point in a WLAN system during an unscheduled service period initiated by the mobile station between scheduled service periods. The traffic flow typically includes reserved data, meaning that the mobile station and access point have negotiated a priority and medium time for the reserved traffic stream to ensure a desired quality of communication, where the medium time indicates the amount of time per negotiated service interval the access point will apportion to the traffic stream or access category. With voice traffic, since it occurs in real time, it is desirable to establish a reserved traffic stream for the communication. The system carrying out the flow shown here in FIGS. 4–5 may be performed by a system using configurations and system components similar to those shown in FIGS. 1–3 with control software designed in accordance with the teachings herein.

The mobile station transmissions appear on the bottom flow line 502, while the access point transmissions appear on the top flow line 504. As mentioned, prior to the transaction illustrated here, the mobile station and access point will have established a reserved traffic stream, meaning the access point has reserved certain resources to maintain voice quality of the traffic stream. That is, the access point will usually be able to service the flow in a timely manner so that the real time effect of the flow is maintained. To prevent an overloaded scenario in a WLAN voice system, where an excessive number of high priority users might make it difficult for a system to satisfy quality of service requirements, admission control should be required for certain services, such as real time voice and video streaming. For example, in an infrastructure based voice WLAN system, a mobile station (e.g. voice user) should set up a bi-directional traffic flow for voice using a known traffic specification, and the access point should acknowledge the admission of the flow to the mobile station. By admitting the flow, it is meant that the data flow will be a reserved traffic stream having a unique traffic stream identifier. The reserved traffic stream will have a priority classification and will be apportioned a minimum amount of channel access time. During the connection setup period, the scheduled power save mechanism can be established by mobile station implicitly by the use of a traffic specification reservation. In frames containing data for the reserved traffic stream, the unique traffic stream identifier (TSID) will be included. The mobile station can choose no power save operation, legacy power save operation, scheduled power save operation only, or the present hybrid power save operation. After the traffic flow is admitted by the access point, the mobile station puts the WLAN subsystem in a low power state.

After the WLAN subsystem is placed in low power mode, the mobile station maintains a service interval timer to maintain real time operation of the flow during scheduled service periods. However, if data remains at the access point after a scheduled service period, the mobile station may choose to initiate an unscheduled service period. At the beginning of an unscheduled service period, the mobile station activates the WLAN subsystem at time 506. After which, during the time period 507, the mobile station begins contending for the WLAN channel. The mobile station initiates the unscheduled transaction by transmitting a polling frame 508. The polling frame may be a voice frame, which in the preferred embodiment contains a unique traffic stream identifier, and a frame of voice data if the user of the mobile station is presently speaking, or if there is no voice data to transmit presently, the polling frame will be a null frame. The polling frame will identify the reserved traffic stream. The polling frame may also include signaling to indicate a desire for the access point to use an aggregate response method so that both reserved and unreserved data may be received from the access point. Alternatively, the aggregate response may be the default response mode.

In the preferred embodiment, after the access point receives the polling frame, it transmits an acknowledgement 510 within a short interframe space time period 512, which is a scheduled event, in accordance with the IEEE 802.11 specification. In response to receiving the polling frame, the access point transmits at least one response frame 516 to the mobile station, assuming the access point has aggregate buffered data for the mobile station. Assuming there is both unreserved data and reserved data in the aggregate buffer, at least a second response frame 518 will be transmitted. The access point will continue to transmit response frames until the aggregate buffer is empty, or, alternatively, if the access point must perform other scheduled tasks. Each response frame includes an end of uplink service period (EUSP) bit, such as a MORE_DATA bit to indicate whether there is more data coming from the access point, or whether the present response frame is the last response frame for the service period. It is contemplated that the access point may not completely empty the aggregate buffer of unreserved data if the access point is presently servicing a high number of reserved traffic streams for other mobile station, and the delivering the unreserved data may interfere with the delivery of reserved traffic.

The time period between receiving the polling frame and transmitting the response frame can vary as the access point may have to finish attending to another flow for another mobile station. In the preferred embodiment, there will typically be a turnaround interframe space time period 514 between the acknowledgement and the response frame. As soon as possible, the access point will acquire the WLAN channel and transmit the response frame or frames. However, the response frame is not sent with regard to any predetermined schedule. That is, mobile station maintains the WLAN subsystem powered up for an indeterminate period of time. Of course, a reasonable maximum period of time could be observed to prevent the mobile station waiting too long for a response frame or remaining active too long. In the event the maximum period occurs, the mobile station can take appropriate action, such as polling the access point a second time during the service period to check the status of the power save buffers and retrieve any frames waiting to be transmitted. The response frame will identify the reserved traffic stream when it contains reserved data. If the access point has data in the reserved buffer associated with the reserved traffic stream, the access point will transmit a frame of data from the buffer. If there is no data in the aggregate buffer, the access point will transmit a null frame. Alternatively, if the aggregate buffer is empty, then the acknowledgement 510 may indicate such. In the response frame there will be signaling information, such as an EUSP bit designated to indicate the end of the present service period, which may occur because there is no more data to transmit or because the access point must perform other scheduled tasks. In the preferred embodiment a MORE_DATA bit may be used as the EUSP bit. If the MORE_DATA bit is cleared in the response frame, it indicates the end of the unscheduled service period due to successful transmission of all buffered frame for the mobile station in the aggregate buffer, or the end of the unscheduled service period due to time considerations. If the access point transmits a null frame in the response frame, access point may also use the MORE_DATA bit to indicate there is no more data and to signal that the present unscheduled service period is over. If the reserved buffer has only one frame of data buffered, it will transmit that frame of data, and likewise set the MORE_DATA bit to indicate there is no more data if the aggregate buffer is empty, otherwise the unreserved data in the aggregate buffer will also be transmitted to the mobile station. In response to receiving the response frame, in the preferred embodiment, the mobile station transmits an acknowledgement 520 within a short interframe space time period 518. If the response frame indicated the end of the present unscheduled service period, the mobile station then places the WLAN subsystem into a low power state after receiving the response frame at time 522.

Figure 6:
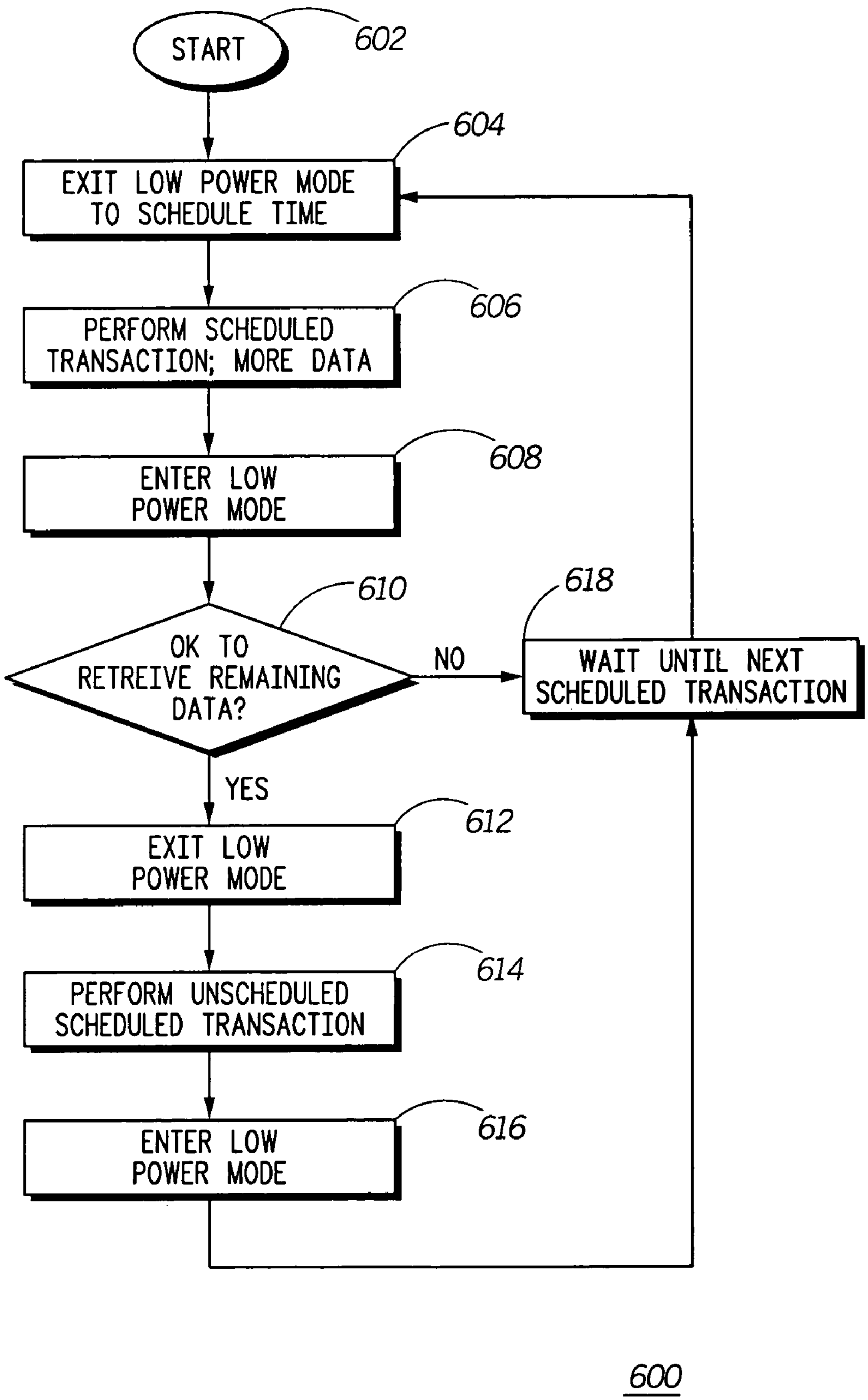
FIG. 6 shows a flow chart diagram illustrating a hybrid method of performing power save operation in a mobile station of a WLAN, in accordance with the invention.

Referring now to FIG. 6, there is shown a flow chart diagram 600 illustrating a hybrid method of performing power save operation in a mobile station of a WLAN in accordance with the invention. At the start 602 of the method the mobile station and access point have negotiated a reserved traffic stream and established a schedule by which to exchange data for the reserved traffic stream and the mobile station has put its WLAN subsystem in low power mode until the beginning of a scheduled service period. At the occurrence of the beginning a scheduled service period, the mobile station commences powering up the WLAN subsystem (604) to begin the scheduled transaction (606). During the scheduled service period, the access point transmits reserved data to the mobile station, and identified the traffic stream with the unique traffic stream identifier. At the end of the scheduled service period, the access point still may have data left to transmit to the mobile station, and indicates such in a last frame transmitted to the mobile station. The access point may indicate detailed, per access category buffering information describing the access categories of information buffered at the access point. In IEEE 802.11 there are presently four access categories described, including voice, video, and best effort categories. During the scheduled service period the mobile station may transmit data to the access point as well. After the end of the scheduled transaction, the mobile station may place the WLAN subsystem back into a low power state (608). The mobile station then determines whether an unscheduled transaction is appropriate (610), such as by the detailed access category buffering information provided by the access point, for example. The mobile station may weigh various parameters, such as the present battery status of the mobile station, the type of data present at the access point, and so on. If the mobile station decides an unscheduled transaction is appropriate, the mobile station brings the WLAN subsystem out of low power mode to active mode (612), and initiates an unscheduled transaction (614) in accordance with the method shown and described in FIGS. 4–5. Once the unscheduled transaction is over, the mobile station again places the WLAN subsystem in low power mode (616). The mobile station the waits for the next scheduled service period (618) and repeats the process. Likewise, the mobile station had determined that an unscheduled transaction would not be appropriate (610), due to, for example, low battery power or the data at the access point is of low priority, the mobile station will skip the unscheduled transaction and wait for the next scheduled transaction (618).

Figure 7:
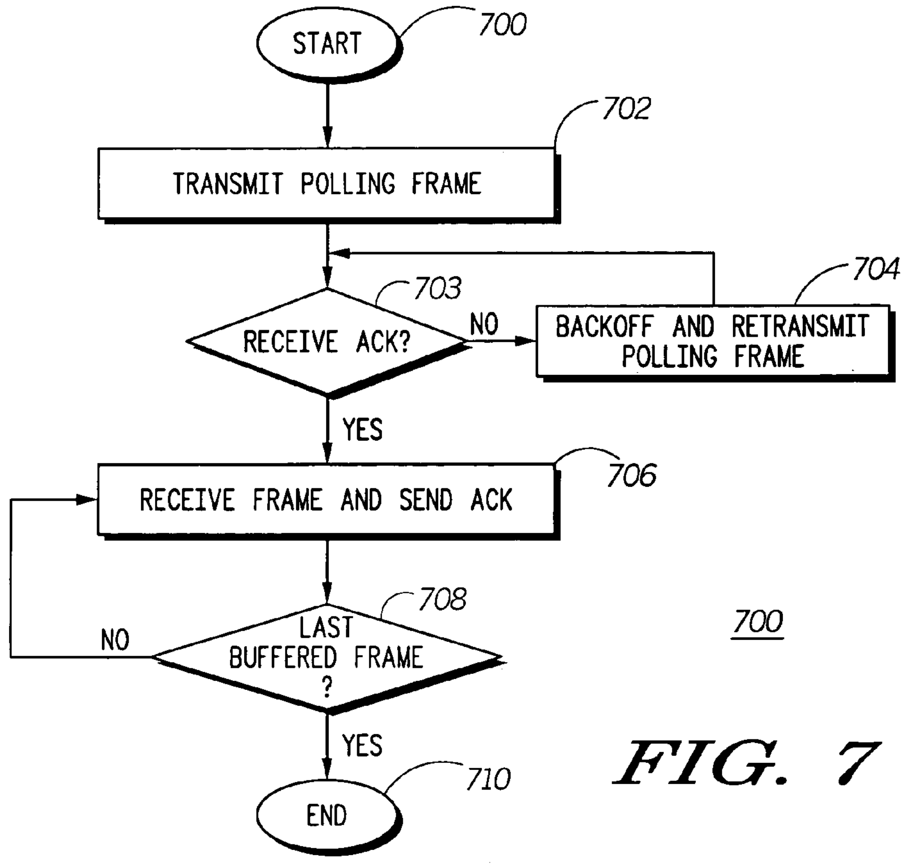
FIG. 7 shows a flow chart diagram of a mobile station frame exchange process during an unscheduled service period, in accordance with the invention.

Referring now to FIG. 7, there is shown a flow chart diagram of a mobile station frame exchange process during an unscheduled transaction, in accordance with the invention. At the start 700 the mobile station checks to see if there is data presently pending for the reserved traffic stream from the voice or other real time media processors. If not, then the mobile station waits as the polling window timer times a polling window. The mobile station also contends for the WLAN channel during this time. Once the channel is acquired, the mobile station transmits a polling frame (702). The polling frame will contain data if data was pending, otherwise the polling frame will be a null frame. The polling frame identifies the reserved traffic stream. The reserved traffic stream is preferably identified by its TSID, and the presence of the traffic stream identifier indicates to the access point that the mobile station is using an unscheduled transaction. In one embodiment of the invention, aggregate response from the access point is the default mode, but the aggregate response mode may also be selectable, and the desire to receive an aggregate response may be indicated in the polling frame.

In the preferred mode the access point transmits and acknowledgment which is received by the mobile station (703). If the acknowledgement is not received (704), the mobile station may back off by waiting, then retransmit the polling frame. After transmitting the polling frame, and, in the preferred mode, receiving the acknowledgment, the mobile station then waits for the access point to respond. Since the response is not scheduled, the time of the wait is variable, although the mobile station may have a preselected maximum time period to wait before undertaking an error procedure, assuming a failure of access point to respond. However, assuming normal operation, the access point will transmit an aggregation of response frames which will be received by the mobile station (706). In transmitting data from the aggregate buffer, data belonging to the traffic stream identified by the TSID used by the mobile station in the polling frame may be transmitted first, before unreserved data, in the aggregate response. Again, in the preferred mode, the mobile station will transmit an acknowledgement to assure the access point of a successful delivery. Upon receiving the response frame, the mobile station checks the EUSP bit to see if the UPSD service period is over. In the preferred embodiment, the MORE_DATA bit may be used to signal when more date is coming from the access point (708), and when it is set it indicates that the service period is continuing until at least one more response frame is received. If the MORE_DATA bit indicates subsequent frames are coming, then the mobile station remains active to receive them as it did for the first response frame. It is contemplated that subsequent response frames may contain data for a different reserved traffic stream also in use by the mobile station, or for the present reserved traffic stream. Once a response frame is received indicating no more data is coming from the access point, the process ends (710) and the mobile station places the WLAN subsystem in low power mode.

Figure 8:
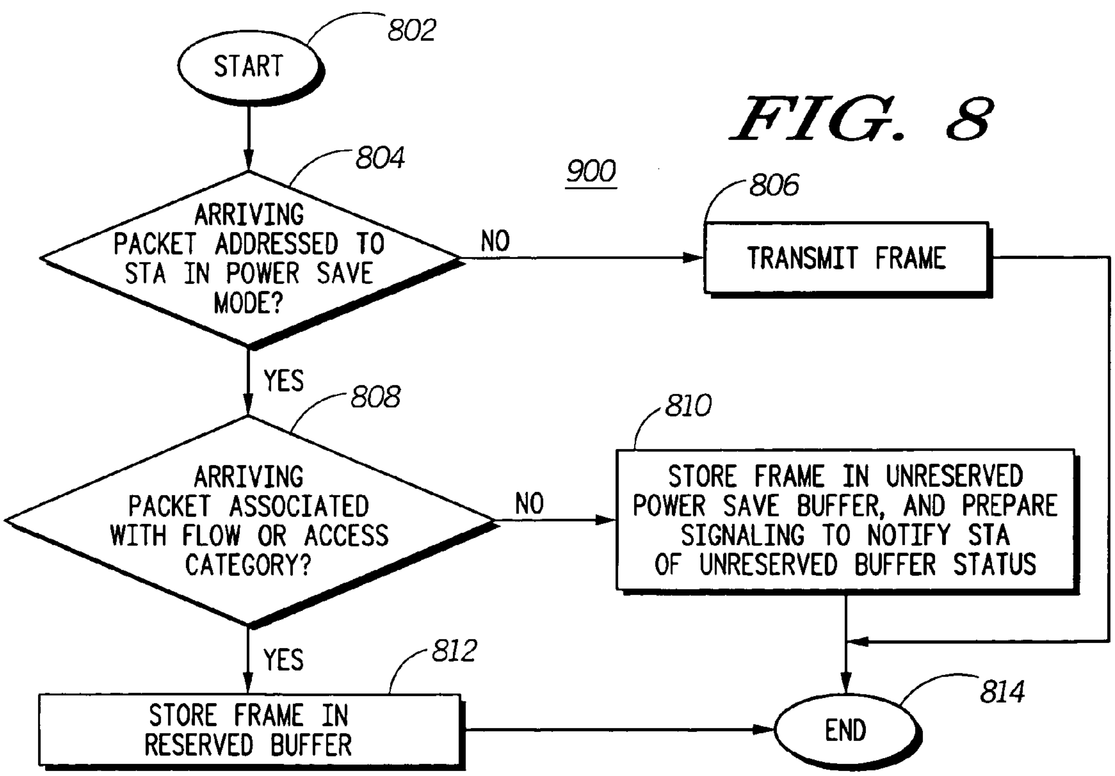
FIG. 8 shows a flow chart diagram of a method of buffering data at an access point, in accordance with the invention.

Referring now to FIG. 8, there is shown a flow chart diagram 800 of a method of buffering data at an access point, in accordance with the invention. At the start (802) of the method, the access point has admitted a reserved traffic stream for establishing a call to a mobile station. Data packets arrive from a network at the access point that are designated for the mobile station. As data packets arrive, the access point checks to see if the data packet is destined for a mobile station that is presently in a power save mode (804). If the mobile station for which an arriving packet is destined is not presently in a power save mode, the access point transmits the packet (806) to the mobile station. If the mobile station is presently in a power save mode, then the access point must determine whether the mobile station is using a legacy power save mode or the present unscheduled power save delivery mode (808). If the mobile station is using a legacy power save mode, then the access point buffers the packet in a unreserved buffer (810) and will signal the mobile station as to the state of its buffer in, for example, a periodic beacon frame transmitted by the access point. If the packet is associated with an admitted flow for a mobile station using power save mode, then the packet is stored in the reserved buffer (812).

Therefore the invention provides A method of performing power save operation in a wireless local area network (WLAN) by a mobile station in which a recurring service period schedule set up between the mobile station and an access point. The scheduled service periods occur at periodic intervals and are for maintaining a reserved traffic stream. The reserved traffic stream is identified by a reserved traffic stream identifier, and the mobile station has its WLAN subsystem initially in a low power mode. The method commences by powering up the WLAN subsystem of the mobile station and commencing a scheduled service period. At the end of the scheduled service period the mobile stations receives from the access point an indication that the access point has more data in a buffer of the access point for the mobile station. After receiving the last frame of the scheduled service period, the mobile station places the WLAN subsystem into low power mode. If the mobile station decides it is appropriate, the mobile station then commences initiating an unscheduled service period to retrieve the remaining data buffered at the access point for the mobile station. The unscheduled service period begins by powering up the WLAN subsystem and transmitting a polling frame to the access point. The polling frame includes the reserved traffic stream identifier. In response, the mobile station receives at least one response frame from the access point. At the conclusion of the unscheduled service period, the mobile station places the WLAN subsystem into low power mode. In one embodiment receiving the response frame includes receiving an aggregate response in which both reserved and unreserved data is received. The aggregate mode may be a default mode, or it may be triggered by transmitting the polling frame with an aggregation bit set.

The present method also prescribes a method of retrieving data from an access point by a mobile station in a wireless local area network (WLAN), where the reserved data corresponds to a reserved traffic stream and is identified by a reserved traffic stream identifier. The method includes performing a scheduled transaction between the mobile station and access point during a scheduled service period. The mobile station transitions from a low power WLAN mode to an active WLAN mode to commence the scheduled transaction, and then transitions from the active WLAN mode to a low power WLAN mode upon completion the scheduled transaction. After the scheduled transaction is complete. The mobile station commences performing an unscheduled transaction between the mobile station and access point during an unscheduled service period. The mobile station transitions from a low power WLAN mode to an active WLAN mode to initiate the unscheduled transaction, and then transitions from the active WLAN mode to a low power WLAN mode upon completing the unscheduled transaction. It is contemplated that the unscheduled transaction may be performed in response to the access point indicating at the end of the scheduled service period that the access point still has data for the mobile station, or, alternatively, the mobile station may have data to transmit to the access point. If the access point indicates at the end of the scheduled transaction that there is still data buffered at the access point, the access point may indicate the type of data, such as the access category of the data and whether the data is part of a reserved traffic stream. Data that is part of a reserved traffic stream may be part of a live voice call. The mobile station may decide whether or not to initiate an unscheduled service period by checking various parameters, such as, for example, battery power status, signal quality level, the priority of the data buffered at the access point, and so on.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing power save operation in a wireless local area network (WLAN) by a mobile station, a recurring service period schedule set up between the mobile station and an access point including regularly scheduled service periods for a reserved traffic stream, the reserved traffic stream identified by a reserved traffic stream identifier, the mobile station having a WLAN subsystem that is initially in a low power mode, the method comprising:

powering up the WLAN subsystem of the mobile station;

commencing a scheduled service period;

receiving from the access point at the end of a scheduled service period an indication that the access point has more reserved data of a reserved traffic stream in a buffer of the access point at an end of the scheduled service period;

placing the WLAN subsystem into low power mode at the end of the scheduled service period commencing an unscheduled service period to retrieve the remaining data buffered at the access point for the mobile station, comprising:

powering up the WLAN subsystem;

transmitting a polling frame to the access point, the polling frame including the reserved traffic stream identifier;

receiving at least one response frame from the access point in response to transmitting the polling frame; and placing the WLAN subsystem into low power mode after receiving the at least one response frame.

2. A method of performing power save operation as defined in claim 1, wherein receiving at least one response frame comprises receiving at least one aggregate response frame.

3. A method of performing power save operation as defined by claim 2, wherein receiving the aggregate response frame is received in response to transmitting the polling frame with an aggregate bit set.

4. A method of performing power save operation as defined by claim 1, further comprising receiving an acknowledgement frame at the mobile station from the access point over the WLAN channel in response to transmitting the polling frame.

5. A method of performing power save operation as defined by claim 1, further comprising transmitting an acknowledgement frame from the mobile station to the access point over the WLAN channel in response to receiving the at least one response frame.

6. A method of performing power save operation as defined by claim 2, wherein:

receiving the at least one aggregate response frame includes receiving a header of a first frame of the aggregate response having a MORE_DATA bit set to indicate a second response frame will be transmitted subsequently;

the method further comprising receiving a second response frame at the mobile station.

7. A method of performing power save operation as defined by claim 1, wherein transmitting the polling frame comprises transmitting a null frame.

8. A method of performing power save operation as defined by claim 1, further comprising acquiring the WLAN channel after waking up the WLAN subsystem, performed by contending for the WLAN channel.

9. A method of performing power save operation as defined by claim 8, wherein contending for the WLAN channel is performed by carrier sensing.

10. A method of retrieving data from an access point by a mobile station in a wireless local area network (WLAN), the reserved data corresponding to a reserved traffic stream and identified by a reserved traffic stream identifier, the method comprising:

performing a scheduled transaction between the mobile station and access point during a scheduled service period, the mobile station transitioning from a low power WLAN mode to an active WLAN mode to commence the scheduled transaction, and then transitioning from the active WLAN mode to a low power WLAN mode upon completion the scheduled transactions, wherein the access point indicates at the end of the scheduled transaction that the access point has buffered data for the mobile station that could not be delivered within the scheduled service period; and performing an unscheduled transaction between the mobile station and access point during an unscheduled service period, the mobile station transitioning from a low power WLAN mode to an active WLAN mode to initiate the unscheduled transaction, and then transitioning from the active WLAN mode to a low power WLAN mode upon completing the unscheduled transaction, wherein performing the unscheduled transaction is performed in response to receiving the indication from the access point that the access point has buffered data for the mobile station that could not be delivered within the scheduled service period.

11. A method of retrieving reserved data from an access point by a mobile station as defined in claim 10, wherein the buffered data that could not be delivered during the scheduled service period is reserved data that belongs to a reserved traffic stream.

12. A method of retrieving reserved data from an access point by a mobile station as defined in claim 11, wherein the reserved data that could not be delivered during the scheduled service period is voice data, and wherein the reserved traffic stream is part of a live voice call.

13. A method of retrieving reserved data from an access point by a mobile station as defined in claim 10, further comprising checking a battery status of the mobile station before performing the unscheduled transaction, and commencing performing the scheduled only if the battery status indicates sufficient power budget is available to perform the unscheduled transaction.

* * * * *